(12) United States Patent
Zhang et al.

(10) Patent No.: US 8,473,799 B2
(45) Date of Patent: Jun. 25, 2013

(54) HANDLING OF DISRUPTED SYNCHRONOUS HYBRID AUTOMATIC REPEAT REQUEST (HARQ) CYCLE AT SYSTEM TIME ROLLOVER

(75) Inventors: Xiaoxia Zhang, San Diego, CA (US); Zhengwei Liu, San Diego, CA (US); Hao Xu, San Diego, CA (US); Arnaud Meylan, Bois-Colombes (FR)

(73) Assignee: QUALCOMM Incorporated, San Diego, CA (US)

( * ) Notice: Subject to any disclaimer, the term of this patent is extended or adjusted under 35 U.S.C. 154(b) by 979 days.

(21) Appl. No.: 12/544,455

(22) Filed: Aug. 20, 2009

(65) Prior Publication Data
US 2010/0050039 A1 Feb. 25, 2010

Related U.S. Application Data

(60) Provisional application No. 61/090,708, filed on Aug. 21, 2008.

(51) Int. Cl.
*G06F 11/00* (2006.01)
*G08C 25/00* (2006.01)

(52) U.S. Cl.
USPC ............ 714/748; 714/55; 714/751; 370/315; 370/328

(58) Field of Classification Search
USPC .............. 714/18, 55, 748, 751; 370/315, 328
See application file for complete search history.

(56) References Cited

U.S. PATENT DOCUMENTS

| 4,439,859 A * | 3/1984 | Donnan ........................ 714/748 |
| 7,673,211 B2 * | 3/2010 | Meyer et al. .................. 714/748 |
| 7,796,549 B2 * | 9/2010 | Grilli et al. .................... 370/328 |
| 2003/0002472 A1 * | 1/2003 | Choi et al. ..................... 370/347 |
| 2006/0195576 A1 * | 8/2006 | Rinne et al. ................... 709/226 |
| 2006/0227789 A1 | 10/2006 | Dottling et al. |
| 2009/0225708 A1 * | 9/2009 | Harada et al. ................. 370/329 |
| 2009/0287976 A1 * | 11/2009 | Wang et al. ................... 714/748 |
| 2010/0309892 A1 * | 12/2010 | Torsner et al. ................ 370/336 |

FOREIGN PATENT DOCUMENTS

| EP | 1655879 A1 | 5/2006 |
| EP | 1755355 A1 | 2/2007 |
| JP | 2007536809 A | 12/2007 |
| JP | 2011528872 A | 11/2011 |
| WO | 2007148635 A1 | 12/2007 |

OTHER PUBLICATIONS

"3rd Generation Partnership Project: Technical Specification Group Radio Access Network; Evolved Universal Terrestrial Radio Access (E-UTRA); Multiplexing and channel coding", (Release 8), 3GPP TS 36.212 V8.3.0, May 2008.
"3rd Generation Partnership Project; Technical Specification Group Radio Access Network; Evolved Universal Terrestrial Radio Access (E-UTRA); Physical layer procedures" (Release 8), 3GPP TS 36.213 V8.3.0, May 2008.

(Continued)

*Primary Examiner* — Joseph Schell
(74) *Attorney, Agent, or Firm* — Nerrie M. Zohn

(57) ABSTRACT

Certain aspects of the present disclosure propose techniques for avoiding a disruption in synchronous hybrid automatic repeat request operation at system time rollover. The techniques define the behavior of a system before and after the system frame number (SFN) rollover point to ensure a known relationship between a hybrid automatic repeat request (HARQ) process identification number and system time.

25 Claims, 5 Drawing Sheets

OTHER PUBLICATIONS

"3rd Generation Partnership Project: Technical Specification Group Radio Access Network; Evolved Universal Terrestrial Radio Access (E-UTRA), Medium Access Control (MAC) protocol specification" (Release 8), 3GPP TS 36.321 V8.2.0, May 2008.

3GPP: "3GPP TS 36.321 V8.2.0 (May 2008); 3rd Generation Partnership Project; Technical Specification Group Radio Access Network; Evolved Universal Terrestrial Radio Access (E-UTRA) Medium Access Control (MAC) protocol specification (Release 8)" 3rd Generation Partnership Project (3GPP); Technicalspecification (TS), XX, XX, No. TS 36.321 V8.2.0, May 1, 2008, pp. 1-33, XP002554062.

3GPP RAN1: "3rd Generation Partnership Project; Technical Specification Group Radio Access Network; Evolved Universal Terrestrial Radio Access (E-UTRA) ; Physical layer procedures(Release 8)" 3GPP TS 36.213 V8.3.0, [Online] vol. 36.213, No. V8.3.0, May 1, 2008, pp. 1-45, XP002554705 Sophia Antipolis Retrieved from the Internet: URL:http://www.3gpp.org/ftp/Specs/archive/36-series/36.211/36213-830.zip> [retrieved on Nov. 9, 2009] p. 34, paragraph 8-p. 42, paragraph 9.1.2.

"3rd Generation Partnership Project; Technical Specification Group Radio Access Network; Evolved Universal Terrestrial Radio Access (E-UTRA); Multiplexing and channel coding (Release 8)" 3GPP Standard; 3GPP TS 36.212, 3rd Generation Partnership Project (3GPP), Mobile Competence Centre; 650, Route Des Lucioles ; F-06921 Sophia-Antipolis Cedex France, No. V8.3.0, May 1, 2008, pp. 1-48, XP050377549, p. 33.

Alcatel-Lucent: "Implications of Solutions for Subframe Bundling", 3GPP DRAFT; R1-080914—Implicationssubframebundling, 3rd Generation Partnership Project (3GPP), Mobile Competence Centre; 650, Route Des Lucioles; F-06921 Sophia-Antipolis Cedex; France, vol. RAN WG1, No. Sorrento, Italy; Feb. 6, 2008, XP050109387.

Catt et al: "Proposals on the synchronous HARQ in LTE TDD" 3GPP DRAFT; R2-062932, 3rd Generation Partnership Project (3GPP), Mobile Competence Centre ; 650, Route Des Lucioles ; F-06921 Sophia-Antipolis Cedex ; France, vol. RAN WG2, No. Seoul, Korea; Oct. 5, 2006, XP050132450.

International Search Report and Written Opinion—PCT/US2009/054615, International Search Authority—European Patent Office—Feb. 1, 2011.

Motorola: "N-Channel Stop-and-wait HARQ protocol", 3GPP DRAFT; R1-040678, 3rd Generation Partnership Project (3GPP), Mobile Competence Centre; 650, Route Des Lucioles; F-06921 Sophia-Antipolis Cedex; France, vol. RAN WG1, No. Cannes; Jun. 18, 2004, XP050112021.

Qualcomm Europe: "HARQ process ID at SFN roll over in TDD" 3GPP DRAFT; R2-085439 HARQ Process ID at SFN Roll Over in TDD, 3rd Generation Partnership Project (3GPP), Mobile Competence Centre ; 650, Route Des Lucioles ; F-06921 Sophia-Antipolis Cedex ; France, No. Prague, Czech Republic; 20080923, Sep. 23, 2008, XP050320272.

* cited by examiner

| D | S | U0 | U1 | U2 | D | S | U3 | U4 | U5 | D | S | U6 | U0 | U1 | D | S | U2 | U3 | U4 |

| D | S | U5 | U6 | U0 | D | S | U1 | U2 | U3 | D | S | U0 | U1 | U2 | D | S | U3 | U4 | U5 |

306 ⏎ 308

← SFN ROLLOVER

FIG. 3C

HANDLING OF DISRUPTED SYNCHRONOUS HYBRID AUTOMATIC REPEAT REQUEST (HARQ) CYCLE AT SYSTEM TIME ROLLOVER

CLAIM OF PRIORITY UNDER 35 U.S.C. §119

The present application for Patent claims benefit of Provisional Application Ser. No. 61/090,708 filed Aug. 21, 2008, and assigned to the assignee hereof and hereby expressly incorporated by reference herein.

TECHNICAL FIELD

The present disclosure generally relates to wireless communication, and more particularly, to techniques for avoiding a disruption in synchronous hybrid automatic repeat request operation at system time rollover.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the mobile stations, and the reverse link (or uplink) refers to the communication link from the mobile stations to the base stations. This communication link may be established via a single-in-single-out, multiple-in-single-out or a multiple-in-multiple-out (MIMO) system.

Synchronous hybrid automatic repeat request (HARQ) operation has been adopted for the uplink shared channel (ULSCH) data transmission in the LTE standard for both frequency division duplexing (FDD) and time division duplexing (TDD). In the synchronous transmission, there is a fixed relationship between the HARQ process identifier (ID) and the system time. The system time in general is uniquely defined within a period as t=radio_frame_number*10+subframe number. Accordingly, the HARQ process ID generally does not need to be signaled to a user equipment (UE) in a downlink control information (DCI) message in format 0, as there exists a common understanding between a UE and a base station (e.g., access points, Node B, Evolved Node B eNodeB, eNB) about which process is used in each subframe.

On the other hand, a system frame number (SFN) generally has a limited number of bits which may be defined in the master information block (MIB). The SFN rolls over after reaching the maximum number of supported radio frames. For evolved universal mobile telecommunication systems terrestrial radio access network (E-UTRAN, according to the 3GPP LTE standard), the SFN may be signaled with 10 bits. In order to avoid disruption in synchronous HARQ operation, a similar relationship between the HARQ process ID and the system time needs to be maintained at all times even if the SFN rolls over.

Therefore, there is a need in the art for techniques to avoid disruption of service in synchronous hybrid automatic repeat request operation at system time rollover.

SUMMARY

Certain aspects provide a method for wireless communications. The method generally includes identifying a system frame number (SFN) rollover time, indicating when a system frame number rolls over from a first value to a second value, wherein the second value is smaller than the first value, stopping hybrid automatic repeat request (HARQ) operation at or near SFN rollover time for one or more HARQs, and restarting uplink HARQ operation from the SFN rollover time.

Certain aspects provide an apparatus for wireless communications. The apparatus generally includes logic for identifying a system frame number (SFN) rollover time, indicating when a system frame number rolls over from a first value to a second value, wherein the second value is smaller than the first value, logic for stopping hybrid automatic repeat request (HARQ) operation at or near SFN rollover time for one or more HARQs, and logic for restarting uplink HARQ operation from the SFN rollover time.

Certain aspects provide an apparatus for wireless communications. The apparatus generally includes means for identifying a system frame number (SFN) rollover time, indicating when a system frame number rolls over from a first value to a second value, wherein the second value is smaller than the first value, means for stopping hybrid automatic repeat request (HARQ) operation at or near SFN rollover time for one or more HARQs, and means for restarting uplink HARQ operation from the SFN rollover time.

Certain aspects provide a computer-program product for wireless communications, comprising a computer-readable medium having instructions stored thereon, the instructions being executable by one or more processors. The instructions generally include instructions for identifying a system frame number (SFN) rollover time, indicating when a system frame number rolls over from a first value to a second value, wherein the second value is smaller than the first value, instructions for stopping hybrid automatic repeat request (HARQ) operation at or near SFN rollover time for one or more HARQs, and instructions for restarting uplink HARQ operation from the SFN rollover time.

Certain aspects provide an apparatus for wireless communications by an access point. The apparatus generally includes at least one processor configured to identify a system frame number (SFN) rollover time, indicating when a system frame number rolls over from a first value to a second value, wherein the second value is smaller than the first value, stop hybrid automatic repeat request (HARQ) operation at or near SFN rollover time for one or more HARQs, restart uplink HARQ operation from the SFN rollover time, and a memory coupled to the processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 3A-3C illustrate example schematic depicting system frame number (SFN) roll over in frequency division duplex and time division duplex systems.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95 and IS-856 standards.

A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of the Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) is a technique that utilizes single carrier modulation and frequency domain equalization. The SC-FDMA has similar performance and essentially the same overall complexity as those of the OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
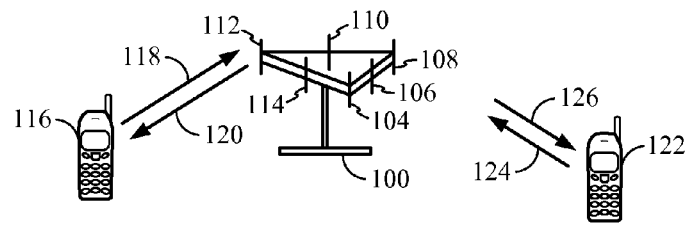
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas, and/or the area in which they are designed to communicate, is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$ Each of the NS independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) or frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 2:
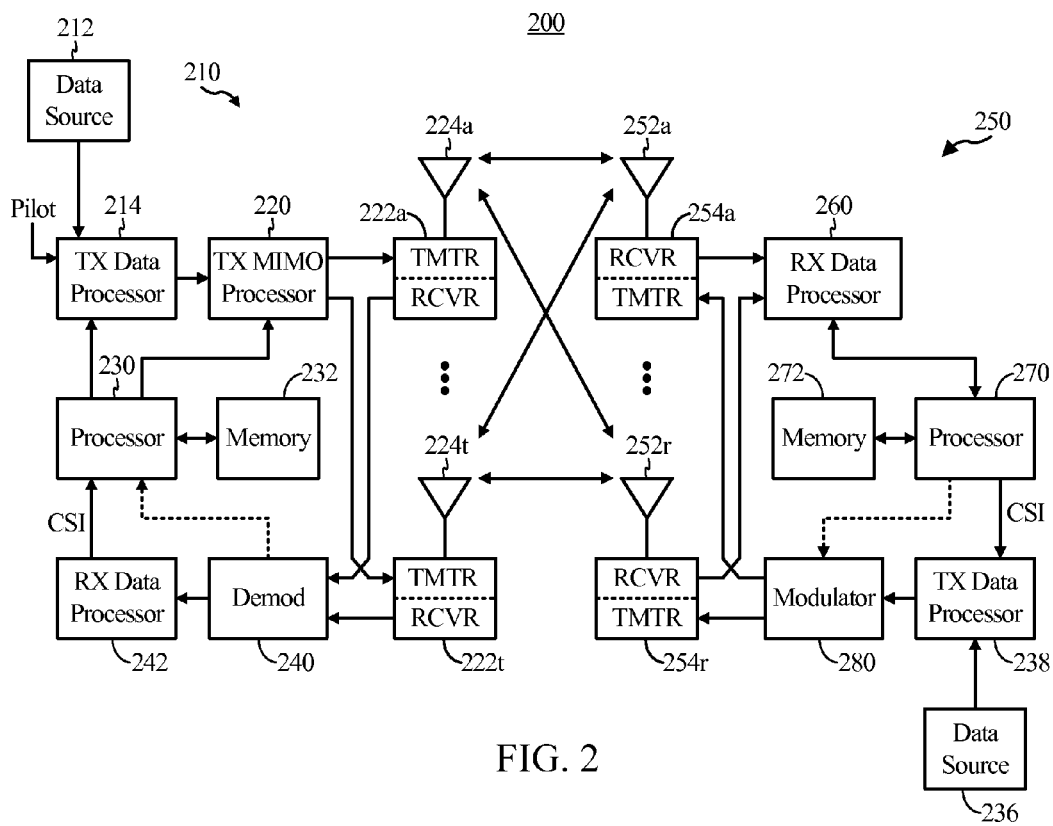
FIG. 2 illustrates a block diagram of a communication system.

FIG. 2 is a block diagram of an embodiment of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped)

based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Handling of Disrupted Synchronous Hybrid Automatic Repeat Request (HARQ) Cycle at System Time Roll-Over In synchronous hybrid automatic repeat request (HARQ) transmission, there is a fixed relationship between the HARQ process identifier (ID) and system time. Therefore, in some cases the HARQ process ID may not be signaled to a user equipment (UE) in the downlink control information (DCI) message, since there may be a common understanding between a UE and a base station about which process is used in each subframe.

On the other hand, a system frame number (SFN) has a limited number of bits which may be defined in the master information block (MIB). The SFN rolls over after reaching the maximum number of radio frames. In order to avoid disruption in synchronous HARQ operation, a similar relationship between HARQ process ID and system time needs to be maintained at all times even if the SFN rolls over.

The present disclosure provides techniques that preserve a consistent uplink hybrid automatic repeat request (UL HARQ) operation between a UE and a base station when the SFN rolls over.

For purposes of exposition rather than limitation, the following definitions are provided to explicate various aspects of the disclosed subject matter. As provided herein, uplink HARQ round trip processing may include a plurality of subframes, such as a downlink subframe, an uplink subframe, a time to decode PUSCH subframes, and an acknowledgement/negative acknowledgement (ACK/NACK) subframe. The downlink (DL) subframe may carry uplink (UL) grants (e.g., in conjunction with a physical downlink control channel (PDCCH)). The uplink (UL) subframe may carry physical uplink shared channel (PUSCH) transmissions. The downlink ACK/NACK message may be sent on a physical hybrid automatic repeat request indicator channel (PHICH). In this regard, a minimum of 3 ms is typically required for transmission of a signal and reception of a response, such as an uplink grant in PDCCH or PHICH channels.

Moreover, as provided herein, a HARQ repetition period R is the number of subframes of a Radio Frame Structure to maintain a similar timing relationship between 'grant to transmission' and 'transmission to ACK.' In other words, R represents the HARQ periodicity. For example, for FDD, R may be equal to 8, for TDD configurations 1 to 5, R may be equal to 10, for TDD configuration 0, R may be equal to 35 and for TDD configuration 6, R may be equal to 60.

Additionally, as provided herein, SFN roll over number N may be the number of radio frames between two consecutive SFN rollover points. For instance, SFN roll over number N may be either a natural rollover of n bits (N=2), or any integer, expressed as n=$\lceil \log_2 N \rceil$ bits, $0 \leq SFN \leq N-1$. For the purposes of the long term evolution (LTE) standard, n may be 10, and N may be 1024 or smaller.

Further, as utilized herein, system time A may be determined by a subframe number (e.g., in the LTE standard, A=10*System Frame Number+SubframeNumber). System roll over number M may be the number of subframes between two SFN rollover points (e.g., for the LTE, M=10*N).

The SFN rollover period may be defined as subframes before and after SFN rollover points, in which the normal HARQ repetition period is interrupted. The SFN roll over period starts at the first subframe where the hybrid automatic repeat request (HARQ) round trip time is beyond the SFN rollover point. If operated as usual, the relationship between the process ID and system time of this subframe may be invalid. The SFN roll over period also contains a few subframes after the SFN rollover point which do not relate to a HARQ full cycle due to SFN rollover interruption.

It should be noted that when the system roll over number M is divisible by the HARQ repetition period R, there is no interruption of the HARQ cycle because of system-time rollover and the system may continue its normal operation after the SFN rollover.

For example, under normal synchronous HARQ operation, the number of HARQ processes for FDD is typically set to 8.

The system frame number accommodates N radio frames and thus, 10N subframes. If 10N is divisible by 8, when the SFN wraps around, the HARQ process number in the radio frames after the SFN rollover point may continue from the previous radio frames. Therefore, the system may continue its normal operation after the SFN rollover.

As another example, for a system utilizing TDD configurations 1 to 5, the HARQ repetition period R is equal to one radio frame (i.e., 10). Therefore, when an SFN wraps around (i.e., rolls over), the HARQ process number in the radio frames after the SFN rollover point continues from the previous radio frames. Therefore, the system may continue its normal operation after the SFN rollover.

As will be appreciated by those conversant in this particular endeavor there may be a number of potential issues when the system frame number wraps around with a system roll over number M that is not a multiple of the HARQ repetition period R. This problem may occur for both FDD as well as TDD systems.

A few abnormal synchronous HARQ operation illustrations exemplify potential issues when the SFN wraps around when the system roll over number M is not a multiple of the HARQ repetition period R. In the context of FDD, if the system roll over number M (e.g., in the LTE FDD, M=10N) is not divisible by the HARQ repetition period R (e.g., in the LTE FDD case, R=8), when the SFN wraps around, in order to avoid disruption in the time line, the same relationship between the HARQ process ID and SFN needs to be maintained. This implies that the HARQ process number in the new radio frames may not carry on from the previous radio frames.

Figure 3A:
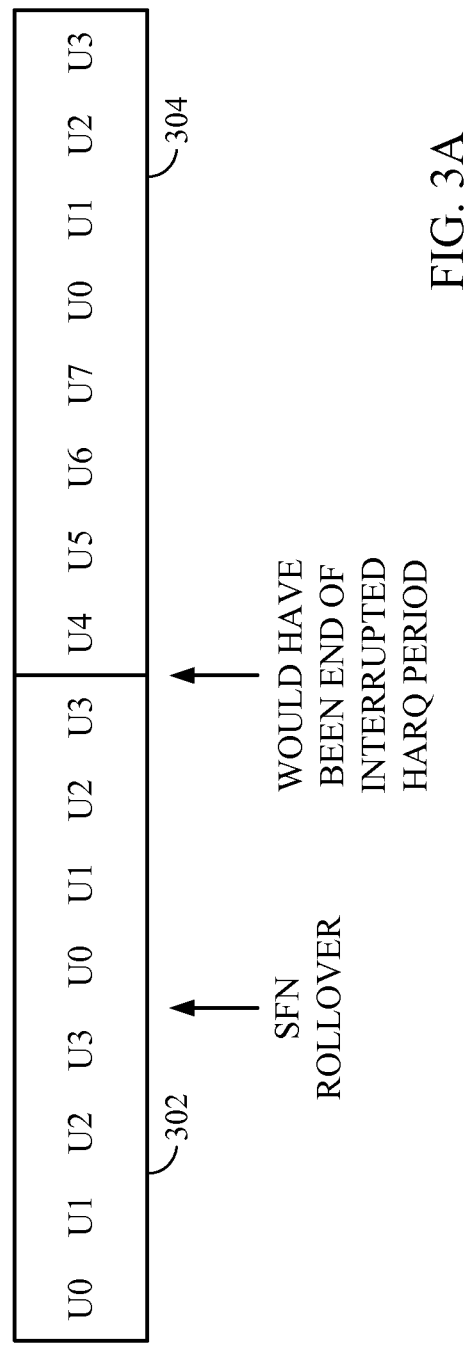

FIGS. 3A-3C illustrate examples of TDD and FDD systems in which a system roll over number can not be divided by the HARQ repetition period.

FIG. 3A illustrates an example of disruption of service in a FDD system at SFN rollover since the system rollover number can not be divided by the HARQ repetition period. As illustrated, the uplink HARQ messages U0 through U7 are transmitted in two consecutive radio frames, 302 and 304. In the normal operation of the system, the HARQ processes wait to receive a message in the physical hybrid automatic repeat request indicator channel (PHICH) that is transmitted 4 sub-frames later. After receiving a message in the PHICH channel, the HARQ processes retransmit 8 sub-frames later.

In FIG. 3A, the SFN rollover happens after the uplink HARQ process U3 in the first radio frame 302. If the HARQ processes that are initiated before the SFN rollover (i.e., processes U0-U3) follow regular HARQ processing, then the corresponding retransmissions may occur at HARQ U4-U7 in the second radio frame 304, which may disrupt overall HARQ operation. It should be noted in connection with FIG. 3A, without loss of generality, that the uplink HARQ labeling does not need to be U0, U1, U2, U3, U4, U5, U6, U7—any repetitive pattern with a period of 8 sub-frames may be applicable.

FIGS. 3B and 3C illustrate HARQ service interruption at SFN rollover in a TDD system, where the uplink HARQ depends on the uplink-downlink configuration. Without loss of generality, configuration 0 is depicted in FIGS. 3B and 3C.

FIG. 3B illustrates a normal HARQ pattern during a HARQ period. The uplink processes U0 through U6 are transmitted in two consecutive radio frames 306 and 308 illustrated in FIG. 3B with no interruption of service compared to FIG. 3C.

FIG. 3C illustrates an example where the HARQ is disrupted due to SFN rollover. Accordingly, when the system rollover number does not divide the HARQ repetition period, the new radio frames start with HARQ process U0 and onwards while the previous radio frame ends with HARQ process U3. In this case, if the HARQ processes U6, U0, U1, U2 and U3 in the first radio frame 306 follow the regular HARQ round trip process, the corresponding retransmissions will happen at different HARQ process IDs in the second radio frame 308. This will disrupt the overall HARQ operation. Once again it should be noted without limitation or loss of generality that the uplink HARQ labeling does not need to be U0, U1, U2, U3, U4, U5, U6—any repetitive pattern with 7 hybrid automatic repeat request processes may be applicable.

Figure 4:
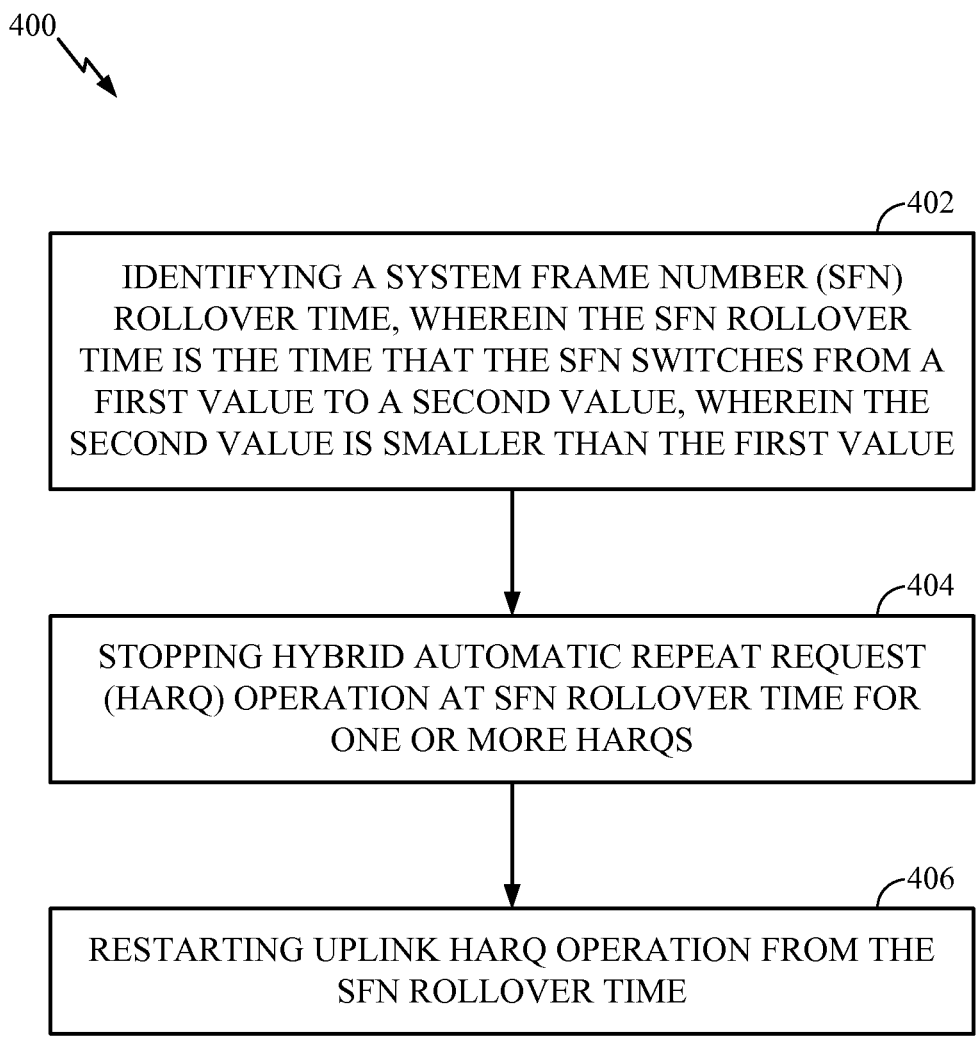
FIG. 4 illustrates example operations for a technique to avoid disruption of service during synchronous hybrid automatic repeat request (HARQ) operation at system time rollover, in accordance with certain aspects of the present disclosure.

FIG. 4 illustrates example operations for a technique to avoid disruption of service during synchronous hybrid automatic repeat request (HARQ) operation at system time rollover, in accordance with certain aspects of the present disclosure. At 402, a system frame number (SFN) rollover time is identified, wherein the SFN rollover time is the time that the SFN switches from a first value to a second value, wherein the second value is smaller than the first value. At 404, hybrid automatic repeat request (HARQ) operation at SFN rollover time for one or more HARQs is stopped. At 406, restart uplink HARQ operation from the SFN rollover time is restarted.

In order to avoid disruption in synchronous uplink HARQ operation and to maintain a fixed relationship between HARQ process ID and system time, the present disclosure provides the following mechanisms.

In accordance with an aspect, in order to maintain the synchronous uplink HARQ operation, both a UE and a base station may restart hybrid automatic repeat request operation at SFN rollover time for all the outstanding HARQs. As a result, both the UE and the base station may restart uplink HARQ operations according to usual rules (e.g., fixed HARQ process ID and system time relationship) from the SFN rollover point. This aspect results in a fairly simple HARQ operation, with one drawback that any outstanding and already partially received data in the HARQ at the time of reset may be lost. The lost packets may need to be retransmitted, potentially by an ARQ method, such as Radio Link Control (RLC) protocols. This may result in an inefficient use of system resources every few seconds (e.g., every 10 seconds). As will be appreciated, this problem may be severe if all the terminals in the system experience SFN rollover at the same time, therefore the system may be subject to a plethora of retransmissions every few seconds.

Alternatively and/or additionally, the foregoing scheme may be augmented by offsetting/adjusting the point of rollover for various UEs in the system, such that the rate of HARQ resets due to SFN roll over is constant in time. For instance, a UE may use an SFN' for the purpose of uplink synchronous HARQ, where SFN'=SFN+f(UE_ID). The function f(.) may be known to the base station and the UE. For example, the UE identification (ID) could be the Cell Radio Network Temporary Identifier (C-RNTI), and the function f(.) may be f(x)=x modulo (SFN rollover number).

In accordance with a further aspect, in order to maintain the synchronous uplink HARQ operation a system rollover number may be defined for a subset or all of the FDD/TDD configurations. For certain aspects, a single system rollover number M may be defined for all of the FDD/TDD configurations. The system roll over number M may be a multiple of the least common multiple of all the HARQ repetition periods of all the UL HARQ operations of the system, which includes the FDD mode, and/or all the uplink-downlink configurations of the TDD mode. For example, M may be the largest integer that satisfies the relation $$n = \left\lceil \log_2 \frac{M}{10} \right\rceil,$$

where n is the number of bits defined in the SFN, $\log_2$ is the logarithm in base two and the function $F\lceil .\rceil$ outputs the largest integer inside.

For another aspect, a system roll over number M may be defined for each FDD/TDD configuration to be a multiple of the HARQ repetition period for that configuration. The system rollover number M may be the largest integer that satisfies the relation $$n = \left\lceil \log_2 \frac{M}{10} \right\rceil.$$

Nevertheless, the foregoing aspects may require a new SFN roll over time and may impact existing implementations. In accordance with yet a further aspect, the uplink HARQ behavior may be defined during the SFN rollover period to restore normal synchronous HARQ operation. In this aspect, the current definitions of the SFN rollover number (i.e., $N=2^n$) and system roll over number (i.e., $M=10N$), may be maintained. As a result, the system rollover number M might not be a multiple of the HARQ repetition period for some uplink HARQ operations.

For SFN rollover periods before the SFN rollover point, the base station may stop sending uplink (UL) grants if the corresponding full uplink HARQ round trip processing can not be finished before SFN reset point. For the SFN rollover period after the SFN reset point, the base station may start the uplink HARQ operation afresh according to the fixed HARQ process ID and system time relationship. For the HARQ process that requires retransmission, the claimed matter may retransmit at the same HARQ process ID location after SFN resets, which may imply that the round trip time is different than for normal operations. Nevertheless, if the retransmission turn around time can not be met, the claimed matter may treat this situation as receiving a negative acknowledgement (NACK), or may refrain from transmitting in those subframes, therefore, the retransmissions only happen when the turn around time is met.

In accordance with a further aspect, the claimed matter may maximize the use of uplink sub-frames after SFN reset by sending UL grant messages before SFN reset point for those uplink subframes which will not have corresponding UL grants after SFN resets. For FDD, if UL transmission happens at time n, the UL grant may be sent at time n−4. For TDD, if UL transmission happens at time n, the UL grant is sent at a time according to one or more physical uplink shared channel related procedures.

Alternatively and/or additionally, the claimed matter may maximize the use of uplink sub-frames before the time that an SFN resets. Therefore, in the SFN rollover period before the SFN reset point, the base station may stop sending uplink grant messages if the uplink transmission time is beyond SFN reset point. In the SFN rollover period after the SFN reset point, the base station may start a new uplink HARQ operation according to the fixed HARQ process ID and system time relationship. For HARQ processes that do not have time to send ACK/NACK messages before the SFN reset, the base station may treat them as processes with NACK messages and soft combine them to the same HARQ process ID after the SFN reset point. For a HARQ process that requires retransmission where the turn-around time can be met, the base station may retransmit at the same HARQ process ID location after the SFN resets. This solution may increase the round trip transmission time compared to the normal operation.

In accordance with a further aspect, a system attempt to optimize the use of uplink sub-frames before SFN resets and reduce the number of retransmissions. By combining the processes that require retransmission where the turn around time can be met, these processes may be treated as a single transmission. In this aspect, the corresponding ACK/NACK messages may be sent according to the regular time line even after the SFN reset point. Thus, for FDD, if the uplink transmission happens at time n, the ACK/NACK messages may be sent at time n+4. For TDD, if uplink transmission happens at time n, the ACK/NACK messages may be sent at a time based on the table 1.

Table 1 illustrates the transmission time for an ACK/NACK message based on the uplink subframe index n, and the TDD UL/DL configuration number. For example, if an uplink transmission happens at UL subframe index 3 using TDD UL/DL configuration 1, then the ACK/NACK message may be transmitted at subframe 6.

| TDD UL/DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

In accordance with a further aspect, the claimed matter may maximize the use of UL sub-frames during the SFN roll-over period. In this aspect of the disclosed matter, for the SFN rollover periods before SFN reset points, the claimed matter may send UL grant messages as usual during the SFN rollover period. Further, for the SFN rollover period after SFN reset point, the claimed matter may start uplink HARQ operation afresh according to fixed HARQ process ID and system time relationships.

For HARQ processes that do not have time to send ACK/NACK messages before SFN resets, the claimed matter may directly soft combine them to the same HARQ process ID after SFN resets (e.g., treat them as NACK messages), or treat these UL sub-frames as single transmissions where the corresponding ACK/NACK messages may be sent according to the regular time line even after SFN resets. Additionally, for HARQ processes that require retransmission where the turn-around time may be met, the claimed matter may retransmit at the same HARQ process ID location after SFN resets, with the implication that the round trip time may be different than normal operation.

In yet a further aspect, asynchronous HARQ operations may be utilized wherein the HARQ process ID needs to be signaled to a UE in downlink control information (DCI) message format 0.

Figure 4A:
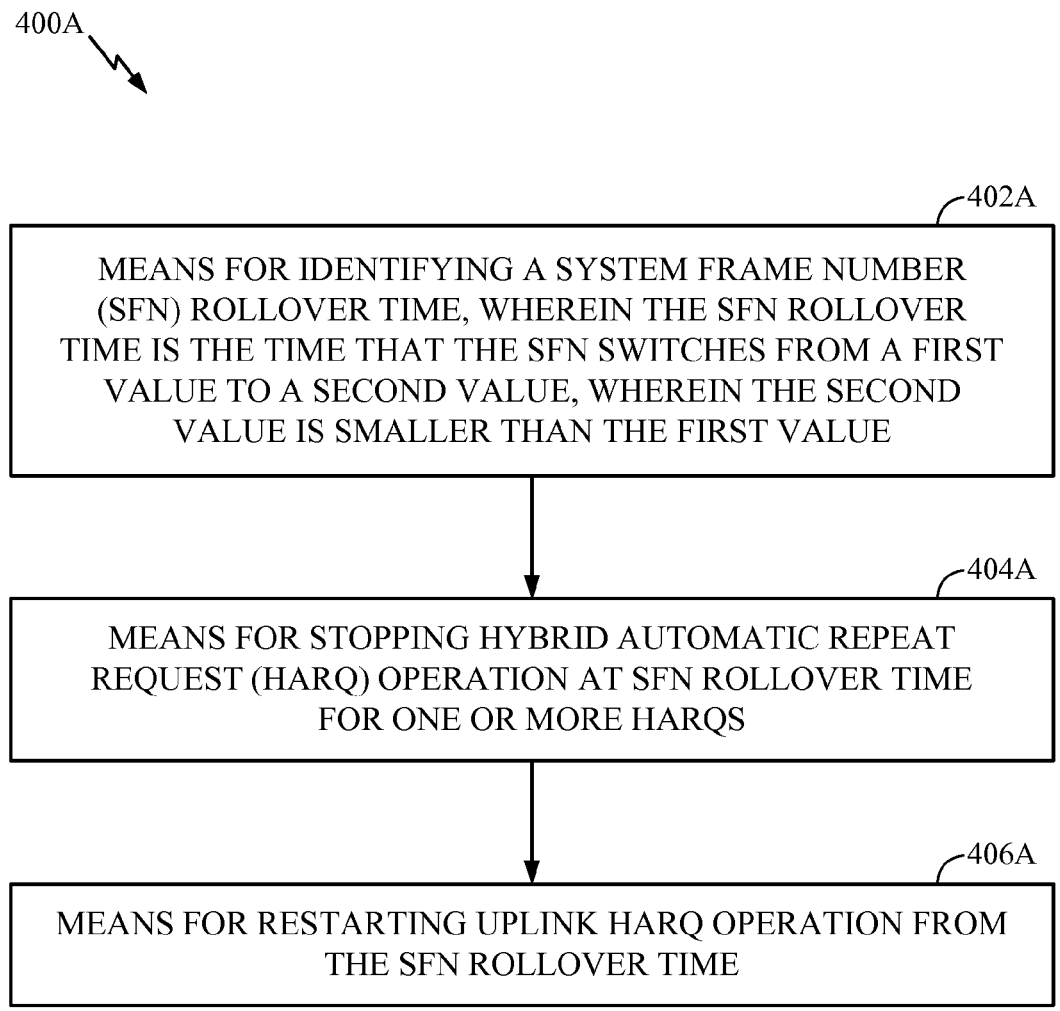
FIG. 4A illustrates example components capable of performing the operations illustrated in FIG. 4.

The various operations of methods described above may be performed by various hardware and/or software component(s) and/or module(s) corresponding to means-plus-function blocks illustrated in the Figures. For example, operation 400 illustrated in FIG. 4 corresponds to means-plus-function block 400A illustrated in FIG. 4A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
identifying a system frame number (SFN) rollover time, indicating when a system frame number rolls over from a first value to a second value, wherein the second value is smaller than the first value;
stopping hybrid automatic repeat request (HARQ) operation at or near SFN rollover time for one or more HARQs; and
restarting an uplink HARQ operation from the SFN rollover time.

2. The method of claim 1, further comprising:
adjusting one or more SFN rollover times for one or more user equipments (UEs) in a system such that the rate of HARQ reset due to SFN rollover is constant in time.

3. The method of claim 1, further comprising:
determining a system rollover number M; wherein the system rollover number is a difference between two consecutive SFN rollover times.

4. The method of claim 3, wherein the system rollover number M is a multiple of the least common multiple of one or more of the HARQ repetition periods of a plurality of uplink HARQ operations of a system, wherein the plurality of uplink HARQ operations of the system include HARQ operations performed in a frequency division multiplexing mode, and HARQ operations performed in a plurality of different uplink-downlink configurations of a time division multiplexing mode.

5. The method of claim 3, wherein the system rollover number M is the largest integer that satisfies a relation n=

$$n = \left\lceil \log_2 \frac{M}{10} \right\rceil,$$

wherein n is the number of bits defined in the SFN, $\log_2$ is the logarithm in base two, and the function $\lceil . \rceil$ outputs the largest integer inside.

6. The method of claim 1, wherein stopping hybrid automatic repeat request (HARQ) operation at SFN rollover time for one or more HARQs comprises:
sending an uplink grant message if roundtrip processing of a message can be finished before SFN rollover time, wherein the roundtrip processing of a message comprises transmitting the message and receiving a response to the message.

7. The method of claim 1, wherein stopping hybrid automatic repeat request (HARQ) operation at SFN rollover time for one or more HARQs comprises:
sending an uplink grant if a corresponding uplink transmission time ends before SFN rollover time.

8. The method of claim 7, further comprising:
combining HARQ processes that did not have time to send ACK/NACK before SFN rollover; and
sending the combined HARQ process using a process identification (ID) after SFN rollover time; wherein the process ID is similar to a process ID before the SFN rollover time.

9. An apparatus for wireless communications, comprising:
at least one processor configured to:
identify a system frame number (SFN) rollover time, indicating when a system frame number rolls over from a first value to a second value, wherein the second value is smaller than the first value;
stop hybrid automatic repeat request (HARQ) operation at or near SFN rollover time for one or more HARQs; and
restart an uplink HARQ operation from the SFN rollover time and a memory coupled to the at least one processor.

10. The apparatus of claim 9, wherein the at least one processor is further configured to:
adjust one or more SFN rollover time for one or more user equipments (UEs) in a system such that the rate of HARQ reset due to SFN rollover is constant in time.

11. The apparatus of claim 9, wherein the at least one processor is further configured to:
determine a system rollover number M; wherein the system rollover number is a difference between two consecutive SFN rollover times.

12. The apparatus of claim 11, wherein the system rollover number M is a multiple of the least common multiple of one or more of the HARQ repetition periods of a plurality of uplink HARQ operations of a system, wherein the plurality of uplink HARQ operations of the system include HARQ operations performed in a frequency division multiplexing mode, and HARQ operations performed in a plurality of different uplink-downlink configurations of a time division multiplexing mode.

13. The apparatus of claim 11, wherein the system rollover number M is the largest integer that satisfies a relation $$n = \left\lceil \log_2 \frac{M}{10} \right\rceil,$$

wherein n is the number of bits defined in the SFN, $\log_2$ is the logarithm in base two, and the function $\lceil . \rceil$ outputs the largest integer inside.

14. The apparatus of claim 9, wherein the at least one processor configured to stop hybrid automatic repeat request (HARQ) operation at SFN rollover time for one or more HARQs is further configured to:
send an uplink grant message if roundtrip processing of a message can be finished before SFN rollover time, wherein the roundtrip processing of a message comprises transmitting the message and receiving a response to the message.

15. The apparatus of claim 9, wherein the at least one processor configured to stop hybrid automatic repeat request (HARQ) operation at SFN rollover time for one or more HARQs is further configured to:
send an uplink grant if a corresponding uplink transmission time ends before SFN rollover time.

16. The apparatus of claim 15, wherein the at least one processor is further configured to:
combine HARQ processes that did not have time to send ACK/NACK before SFN rollover; and
send the combined HARQ process using a process identification (ID) after SFN rollover time; wherein the process ID is similar to a process ID before the SFN rollover time.

17. A hardware apparatus for wireless communications, comprising:
means for identifying a system frame number (SFN) rollover time, indicating when a system frame number rolls over from a first value to a second value, wherein the second value is smaller than the first value;
means for stopping hybrid automatic repeat request (HARQ) operation at or near SFN rollover time for one or more HARQs; and
means for restarting an uplink HARQ operation from the SFN rollover time.

18. The apparatus of claim 17, further comprising:
means for adjusting one or more SFN rollover times for one or more user equipments (UEs) in a system such that the rate of HARQ reset due to SFN rollover is constant in time.

19. The apparatus of claim 17, further comprising:
means for determining a system rollover number M; wherein the system rollover number is a difference between two consecutive SFN rollover times.

20. The apparatus of claim 19, wherein the system rollover number M is a multiple of the least common multiple of one or more of the HARQ repetition periods of a plurality of uplink HARQ operations of a system, wherein the plurality of uplink HARQ operations of the system include HARQ operations performed in a frequency division multiplexing mode, and HARQ operations performed in a plurality of different uplink-downlink configurations of a time division multiplexing mode.

21. The apparatus of claim 19, wherein the system rollover number M is the largest integer that satisfies a relation $$n = \left\lceil \log_2 \frac{M}{10} \right\rceil,$$

wherein n is the number of bits defined in the SFN, $\log_2$ is the logarithm in base two, and the function $\lceil . \rceil$ outputs the largest integer inside.

22. The apparatus of claim 17, wherein the means for stopping hybrid automatic repeat request (HARQ) operation at SFN rollover time for one or more HARQs comprises:
means for sending an uplink grant message if roundtrip processing of a message can be finished before SFN rollover time, wherein the roundtrip processing of a message comprises transmitting the message and receiving a response to the message.

23. The apparatus of claim 17, wherein the means for stopping hybrid automatic repeat request (HARQ) operation at SFN rollover time for one or more HARQs comprises:
means for sending an uplink grant if a corresponding uplink transmission time ends before SFN rollover time.

24. The apparatus of claim 23, further comprising:
means for combining HARQ processes that did not have time to send ACK/NACK before SFN rollover; and
means for sending the combined HARQ process using a process identification (ID) after SFN rollover time; wherein the process ID is similar to a process ID before the SFN rollover time.

25. A computer-program product for wireless communications, comprising a non-transitory computer-readable medium having instructions stored thereon, the instructions being executable by one or more processors and the instructions comprising:
- instructions for identifying a system frame number (SFN) rollover time, indicating when a system frame number rolls over from a first value to a second value, wherein the second value is smaller than the first value;
- instructions for stopping hybrid automatic repeat request (HARQ) operation at or near SFN rollover time for one or more HARQs; and
- instructions for restarting an uplink HARQ operation from the SFN rollover time.

* * * * *